US005632555A

United States Patent [19]
Gregory et al.

[11] Patent Number: 5,632,555
[45] Date of Patent: May 27, 1997

[54] MEDICAL THERMOMETER

[75] Inventors: Thomas K. Gregory; John W. Stevenson, both of Carlsbad, Calif.

[73] Assignee: Diatek, L.P., San Diego, Calif.

[21] Appl. No.: 333,958

[22] Filed: Nov. 3, 1994

Related U.S. Application Data

[63] Continuation-in-part of Ser. No. 303,344, Sep. 9, 1994, abandoned.

[51] Int. Cl.$^6$ .............................. G01K 3/04; G01K 7/00; A61B 5/00
[52] U.S. Cl. ........................ 374/102; 128/736; 364/557; 374/164
[58] Field of Search ..................................... 374/164, 169, 374/101, 102, 208, 185; 364/557; 128/736

[56]         References Cited

U.S. PATENT DOCUMENTS

| | | |
|---|---|---|
| 3,729,998 | 5/1973 | Mueller et al. . |
| 3,791,214 | 2/1974 | Keith . |
| 3,828,332 | 8/1974 | Rekai . |
| 3,832,902 | 9/1974 | Usami et al. . |
| 3,834,237 | 9/1974 | Robertson . |
| 3,943,326 | 3/1976 | Henry . |
| 4,158,965 | 6/1979 | Prosky . |
| 4,183,248 | 1/1980 | West . |
| 4,204,429 | 5/1980 | Shimazaki et al. . |
| 4,574,359 | 3/1986 | Ishizaka et al. ........................ 364/557 |
| 4,877,333 | 10/1989 | Ota et al. ................................. 374/169 |
| 5,259,389 | 11/1993 | Muramoto et al. ..................... 128/736 |
| 5,392,031 | 2/1995 | Toriumi et al. ......................... 374/102 |
| 5,473,629 | 12/1995 | Muramoto ............................... 374/169 |

FOREIGN PATENT DOCUMENTS

| | | |
|---|---|---|
| 2 305 720 | 10/1976 | France . |
| 54-25882 | 2/1979 | Japan . |
| 54-107374 | 8/1979 | Japan ..................................... 374/102 |
| 2 084 329 | 4/1982 | United Kingdom ................... 374/169 |

*Primary Examiner*—Diego F. F. Gutierrez
*Attorney, Agent, or Firm*—Pretty, Schroeder, Brueggemann & Clark

[57]         ABSTRACT

An improved prediction-type medical thermometer that provides an accurate estimate of a patient's temperature in substantially reduced time as compared to prior thermometers of this kind. This improved performance is achieved by using a special hollow probe tip having a low heat capacity and incorporating a resistive heater that is actuated only upon removal of the probe from a base housing. The heater regulates the temperature to a value of about 93° F. After the probe is applied to the patient, a microprocessor repeatedly samples the thermistor and estimates the patient's temperature based on the successive samples. If a predetermined number of successive temperature estimates lie within a predetermined error range, the sampling is terminated and the most recent estimate is displayed as the patient's temperature. In addition, when that estimate lies outside of a normal temperature range, an increased number of successive estimates lying within a predetermined error range are required before the thermometer displays the estimated temperature.

13 Claims, 3 Drawing Sheets

MEDICAL THERMOMETER

CROSS REFERENCE TO RELATED APPLICATION

This is a continuation-in-part of U.S. application Ser. No. 08/303,344, filed Sep. 9, 1994, and now abandoned.

BACKGROUND OF THE INVENTION

This invention relates generally to medical thermometers and, more particularly, to electronic thermometers that estimate, or predict, a patient's temperature based on a series of samples of a probe-mounted temperature sensor.

Medical thermometer's of this particular kind have been in common use in the clinical environment for many years. The thermometers typically include an elongated probe configured for convenient oral, rectal, or axillary use, with a thermistor mounted within the probe's remote tip. In use, a hygienic, plastic probe cover is placed over the probe, and the probe is then applied to its appropriate location on the patient, whereupon the temperature of the probe and thermistor begin to rise toward the patient temperature. The thermometer periodically samples the thermistor signal and, using one of several known algorithms, predicts the thermistor's eventual temperature. This temperature prediction is displayed long before the thermistor's temperature actually reaches that predicted temperature.

Various prediction algorithms have been used in the past, all of them providing reasonably accurate temperature predictions as quickly as about 30 seconds after the thermometers are applied to the patients. This represents a marked improvement over the time delays encountered using more traditional glass thermometers, which typically are on the order of about 3 minutes. The time delay is primarily due to the heat capacity of the probe and the fact that applying the probe to the patient, e.g., beneath the tongue, draws down the temperature of the tissue in the immediate region of the probe.

Although prior prediction-type electronic thermometers have proven to be highly successful in the clinical environment, there is still a need for a further improved thermometer that can provide accurate predictions of a patient's actual temperature in substantially less time than generally was achievable in the past. At the same time, however, the thermometer must not sacrifice accuracy for speed and must be of durable construction able to withstand frequent use on multiple patients. The thermometer also must be substantially insensitive to variations in the particular manner in which the thermometer is applied to the patient. The present invention fulfills these needs.

SUMMARY OF THE INVENTION

The present invention is embodied in an improved prediction-type medical thermometer configured to accurately estimate a patient's temperature in substantially less time than was previously achievable. The thermometer includes an elongated probe having a hollow metallic tip, with a temperature sensor, e.g., a thermistor, bonded to an inside wall of that probe tip, for generating an electrical signal that varies according to the sensor's temperature. The thermometer further includes an electrical heater, preferably separate from the temperature sensor and bonded to the inside wall of the probe tip at a location spaced circumferentially from the temperature sensor. An electrical circuit selectively applies a current to the electrical heater, which can take the form of a resistor, to warm the probe tip to a selected temperature in advance of its being applied to the patient. This substantially reduces the time required by the thermometer to accurately estimate the patient's temperature.

In a more detailed feature of the invention, the probe further includes an elongated base, and the hollow metallic tip is sized to be attached securely to that base. The tip is generally cylindrical and formed of stainless steel having a substantially uniform thickness of less than or equal to about 0.1 millimeters. The temperature sensor and the electrical heater are preferably bonded to the inside wall of the probe tip at substantially diametrically opposed locations.

In another feature of the invention, the electrical circuit for applying a current to the electrical heater within the probe tip includes a processor configured to measure the temperature at a start time, prior to receipt of the probe by the patient, and to apply to the electrical heater an initial electrical signal having a prescribed is parameter, e.g., duration, that varies according to that start time temperature. The electrical signal parameter also can be made to vary according to the voltage of the thermometer's electrical power source. The start time temperature conveniently can be measured by measuring the temperature sensor signal. After application of the initial electrical signal, the processor continues to apply an electrical signal, e.g., pulse-width modulated pulses, to the electrical heater, to controllably adjust the temperature sensor's temperature to a selected value, e.g., 93° F., until the probe is applied to the patient.

After the probe is applied to the patient, the processor repeatedly samples the temperature sensor signal, e.g., at regular time intervals, and estimates the patient's temperature based on a plurality of successive samples. The processor terminates its estimating and conditions a display to display the most recent temperature estimate when a prescribed set of conditions has been met, that prescribed set of conditions varying in accordance with the values of the successive temperature estimates. For example, if the most recent estimate indicates that the temperature lies within a prescribed normal temperature range, e.g., 97° F. to 99.5° F., and if a first selected number, e.g., four, of successive estimates are within a first predetermined temperature error range, e.g., a span of 0.2° F., then the processor terminates its processing and conditions the display to display the processor's determination of the patient's temperature, which is the most recent temperature estimate. On the other hand, if the most recent estimate of patient temperature lies outside that normal temperature range, then the processor continues to sample the temperature sensor signal and to provide repeated temperature estimates until a second selected number of successive estimates, e.g., six, lie within a second predetermined temperature error range, e.g., a span of 0.25° F. Thus, when the patient appears to have a temperature that might indicate the need for a therapeutic intervention, the thermometer terminates its measurement process and displays its best estimate of patient temperature only after additional measurements have been made. Prior to terminating the estimating process, the processor can condition the display either to remain blank or to display the successive temperature estimates.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
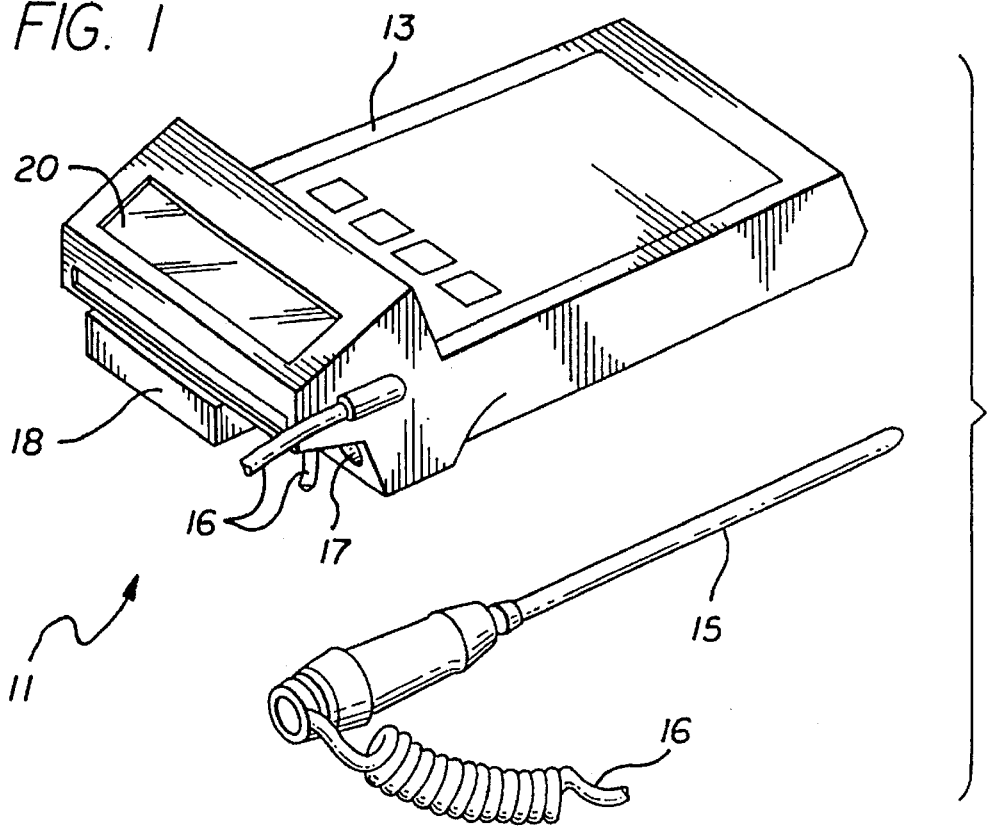
FIG. 1 is a perspective view of a medical thermometer embodying the invention, including an elongated probe configured for application to a patient.
Figure 2:
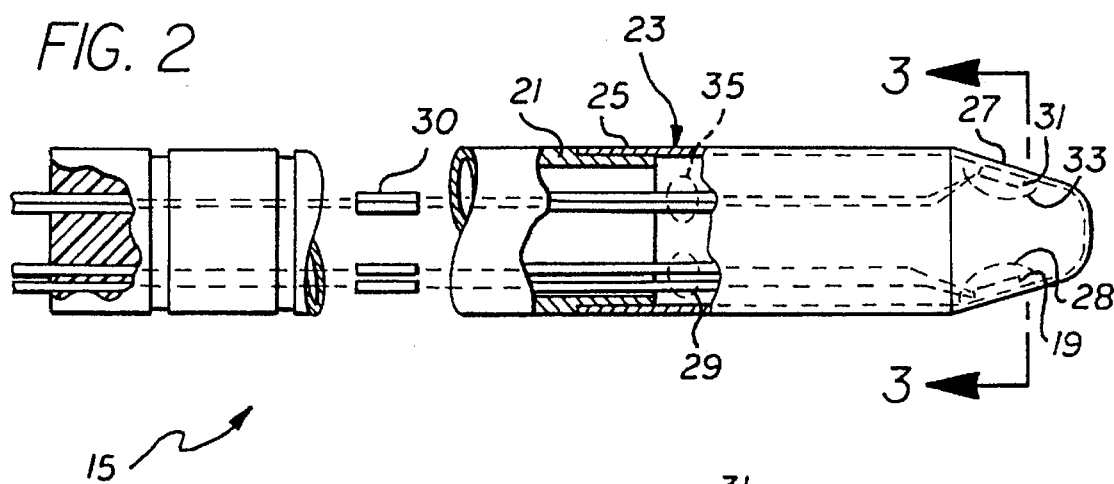
FIG. 2 is a fragmentary, longitudinal cross-sectional view of the elongated probe of FIG. 1.
Figure 3:
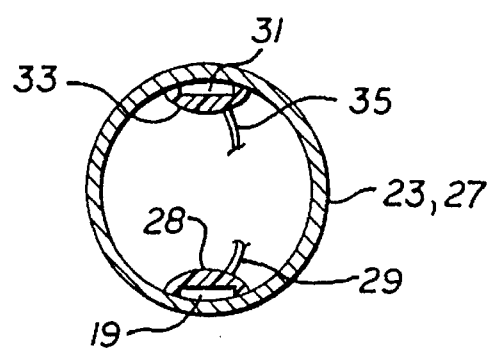
FIG. 3 is a cross-sectional view of the probe's hollow tip, taken substantially in the direction of the arrows 3—3 in FIG. 2.

With reference now to the drawings, and particularly to FIGS. 1-3, there is shown a prediction-type electronic thermometer 11 configured to accurately estimate a patient's temperature. The thermometer includes a base housing 13 and an elongated probe 15 connected together by a flexible wire 16. When not in use, the probe can be stored conveniently in a well 17 formed in the base housing. In use, a hygienic probe cover (not shown) selected from a probe cover supply 18 is placed over the probe, and the probe is applied to a patient, e.g., orally or rectally. The probe includes a thermistor 19 within its remote tip, and electrical circuitry in the base housing 13 monitors the thermistor and estimates the patient's temperature in substantially less time than previously was required by thermometers of this kind. The final temperature estimate is displayed on a display 20 mounted on the base housing.

The elongated probe 15 includes an elongated base 21 and a hollow probe tip 23 configured for secure attachment to the base. The tip is formed of stainless steel having a substantially uniform thickness of about 0.1 millimeters, and it includes a cylindrical section 25 that secures to the base and a frusto-conical section 27 at its remote end. The thermistor 19 is bonded to the inside wall of the frusto-conical section using a thermally-conductive epoxy 28, such as Stycast #2850.

Stainless steel has relatively poor thermal conductivity; however, its high strength allows the probe tip 23 to be made very thin so that heat can be conducted from the patient to the thermistor 19 relatively quickly. The thinness of the wall, coupled with the material's relatively poor heat conductivity, also provides the advantage of reducing the wicking of heat axially along the probe tip, whereby heat flow to the thermistor is further enhanced.

The open end of the cylindrical section 25 of the probe tip 23 is sized to slide over and be retained by the remote end of the probe's base 21. The tip and base can advantageously be secured together using Ecco Bond #51 epoxy. The base likewise is formed of stainless steel and is tubular, but with a wall thickness of preferably about 0.4 millimeters. Electrical leads 29 connect the thermistor 19 with the electrical circuitry located in the base housing 13. These leads extend through the tubular openings in the probe tip 23 and probe base 21. To further reduce the conduction of heat away from the thermistor, short sections of the leads at the site of the thermistor are formed of nickel, which has relatively poor heat conductivity. The remaining sections of the leads are formed of copper. The nickel and copper lead sections are secured to each other by connectors 30.

To reduce the temperature draw down of the thermistor 19 when the probe 15 is placed in the patient's mouth, the thermometer 11 further is configured to preliminarily warm the probe tip to a temperature of about 93° F. prior to its insertion. This is accomplished using a resistor 31 bonded to the inside wall of the frusto-conical section 27 of the hollow probe's tip 23. The resistor is bonded using a thermally conductive epoxy 33, such as Stycast #2850, at a circumferential location diametrically opposed to that of the thermistor. To reduce the power load, this warming is effected only upon removal of the probe from its storage well 17 in the base housing 13. Electrical current is applied to the resistor via leads 35.

To warm the probe tip 23 as rapidly as possible, a substantially continuous pulse of electrical current is initially applied to the resistor 31, for a controllably selected time duration, typically on the order of 1 to 2 seconds. The specific time duration is selected according to the amount of warming determined to be required, which of course depends upon the probe tip's initial temperature at the time it is withdrawn from the well 17. The thermometer 11 therefore is configured to measure this initial temperature and to determine the difference between that measured temperature and the desired 93° F. target temperature. The initial temperature preferably is measured using the thermistor 19. Alternatively, it could be measured using a separate thermistor mounted within the base housing 13, preferably adjacent to the probe cover supply 18.

The appropriate duration for the initial warming pulse is selected by normalizing the desired temperature rise to the probe's known temperature rise undergone when a pulse of a prescribed fixed duration is applied, as determined in a prior test conducted when this same probe 15 was first attached to the base housing 13. Thus, for example, if it is known that a pulse duration of precisely 200 milliseconds will increase the probe tip's temperature from 73.0° F. to 77.0° F., a span of 4.0° F., then it is determined that a pulse duration of about 900 milliseconds will be required to increase the probe's temperature to 93° F. from an initial start temperature measured to be 75° F.

The electrical power delivered to the resistor 31 during the initial warming pulse can vary according to the voltage level of the battery (not shown) located within the base housing 13. If that voltage is relatively low, for example, then a proportionately longer pulse duration will be required to provide the desired heating. The thermometer 11 therefore is configured to measure the battery voltage while a warming pulse is being applied and to adjust the pulse duration, accordingly, to provide the desired warming.

It will be appreciated that the warming function of the resistor 31 could alternatively be provided by the thermistor 19, itself. In that case, care must be taken to ensure that the thermistor temperature is measured only after the transient effects of any warming pulse applied to it have adequately diminished.

The thermometer 11 preferably includes a fail-safe circuit (not shown) that monitors the electrical signal applied to the resistor 31 and intervenes to terminate the signal if it is detected to be present continuously. The initial pulse signal applied to the resistor is periodically interrupted for brief durations, e.g., one millisecond, thus making it only substantially continuous, as mentioned above. This periodic interruption ensures that the fail-safe circuit does not mistake the pulse signal for a failure and intervene to terminate the signal.

After the probe tip 23 has been warmed to approximately the 93° F. target temperature after removal of the probe 15 from the well 17 of the base housing 13, the thermometer 11 operates in a sustain mode, in which it endeavors to regulate the probe tip's temperature at the desired 93° F. value. This is achieved by configuring a microprocessor (not shown)

that is part of the electrical circuitry to periodically read the thermistor 19, e.g., every 200 milliseconds, to ascertain its current temperature, and to provide pulse-width modulated pulses to the resistor 31. The pulse duration of each successive pulse is determined by the formula set forth below, which incorporates 1) a temperature difference or error value, 2) a temperature slope value, and 3) an integrated temperature error value:

$$PW = K_1 * |K_1 + \text{temp error}| * (\text{temp error}) + K_2 * |K_2' + \text{temp slope}| * (\text{temp slope}) + \Sigma K_3 * (\text{temp error})$$

where $K_1$, $K_1'$, $K_2$, $K_2'$ and $K_3$ are constants.

The constants $K_1$, $K_1'$, $K_2$, $K_2'$ and $K_3$ all are derived empirically, based on the particular probe structure being used. The third term in the equation can be limited to a predetermined maximum value. Those skilled in the art are readily capable of deriving an appropriate equation.

This pulse-width modulation control scheme is effective in maintaining the probe tip's temperature at the desired 93° F. even when the probe 15 receives the thermal shock of having a hygienic probe cover placed over it. When that occurs, the probe tip's temperature can be reduced substantially, which causes the temp error and temp slope terms in the above equation to increase substantially. This results in pulses of increased width being applied to the resistor 31, to rapidly bring the probe temperature back to the desired 93° F. value.

The probe 15 is placed into the patient's mouth typically at least 5 seconds after the probe has been removed from the well 17 of the base housing 13. At that time, the temperature of the probe tip 23 and the surrounding probe cover should be at or near the 93° F. target temperature. That is only slightly below the expected mouth temperature, so that very little draw down of the temperature of the patient's mouth tissue will occur. This is important in minimizing the time delay to the accurate estimation of the patient's temperature.

When the probe tip is placed into the patient's mouth, its temperature should almost immediately rise above the 93° F. target value, which should cause the thermometer 11 immediately to reduce to zero duration the pulses it had been applying to the resistor 31. Thereafter, the microprocessor continues to sample the thermistor 19 every 200 milliseconds and, after alternate samples (thus, every 400 milliseconds), analyzes the successive temperature samples and endeavors to curve-fit those samples to the curve for a typical patient. Numerous prediction algorithms are known and are suitable for this purpose, although a least mean square error curve fit is preferred. The curve for the typical patient is previously derived based on tests performed on a large number of individuals.

The microprocessor terminates its sampling of the thermistor 19 and estimating of the patient's temperature only when a prescribed number of successive temperature estimates, which are made every 400 milliseconds, are sufficiently close to each other to provide at least a limited measure of confidence that the estimate is indeed correct. In one feature of the invention, a larger number of such consecutive temperature estimates falling within a predetermined temperature span, i.e., a greater level of stability is required when that estimate is below a selected temperature, e.g., 97° F., or above higher predetermined temperature, e.g., 99.5° F. In those circumstances, a therapeutic intervention could be indicated, so it is important to exercise greater care in ensuring that the temperature estimate is indeed correct.

Thus, in the preferred embodiment, at least 3.6 seconds must have elapsed since the start of the prediction process and six consecutive temperature estimates must lie within 0.25° F. of each other before the processor will terminate its estimating function and display on the display 20 the most recent estimate, when that estimate indicates a temperature less than 97° F. or greater than 99.5° F. On the other hand, a minimum time duration of 1.2 seconds and only four consecutive estimates lying within 0.2° F. of each other are required when a temperature between 97° F. and 99.5° F. is indicated. It will be appreciated that the two above sets of conditions for terminating the processor's estimating function are exemplary, only. More than two different sets of conditions alternatively could be used.

Preferably, the display 20 is conditioned to provide a display of only the final temperature estimate, and it remains blank while the successive estimates are being computed. Alternatively, however, the display could be conditioned to provide a display of all of the successive temperature estimates, and some means of alerting the operator, e.g., a beeper, could be provided when the estimating function has been completed.

Figure 4A:
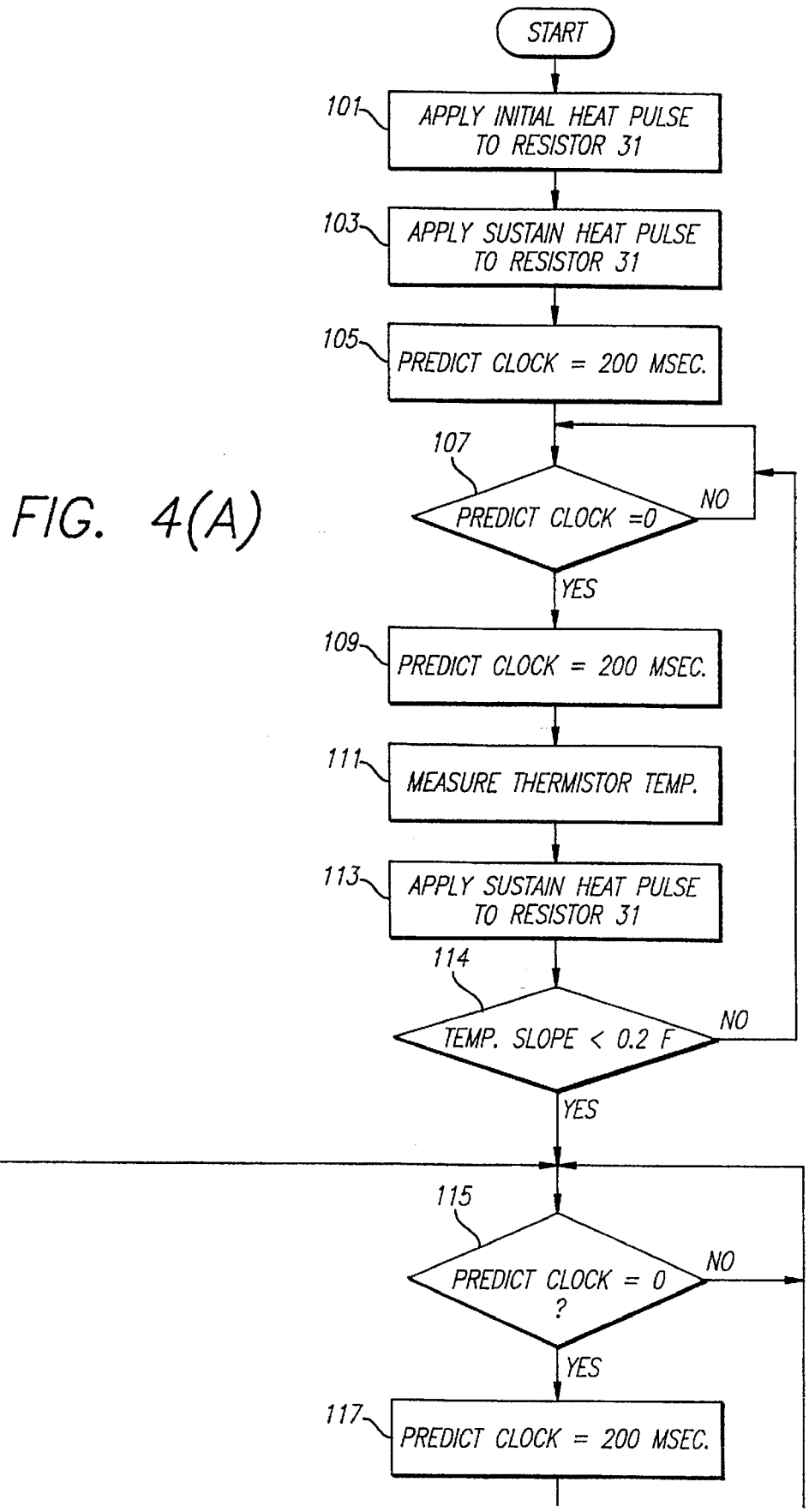
FIG. 4(A) and 4(B) together depict a simplified flowchart showing the operational steps performed by a microprocessor in preliminarily heating the probe tip and estimating the patient's temperature based on a series of thermistor signal samples.
Figure 4B:
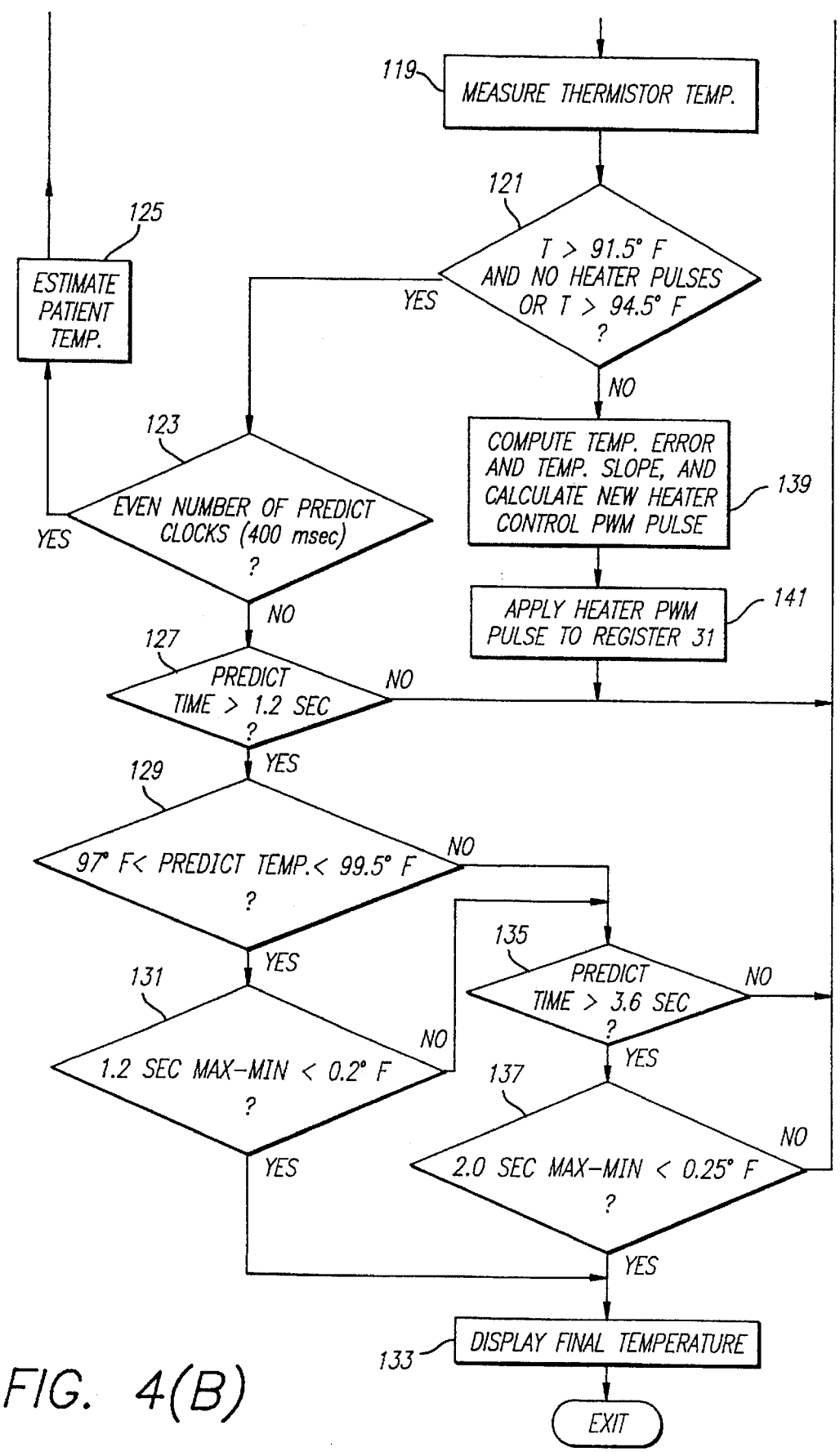

FIGS. 4(A) and 4(B) depict a simplified flowchart of the operational steps performed by the microprocessor in controllably heating the probe tip 23 after its removal from the well 17 of the base housing 13 and, thereafter, in sampling the thermistor signal and estimating the patient's temperature. In an initial step 101 of the flowchart, the processor applies an initial heating pulse to the resistor 31. As mentioned above, this step entails measuring the thermistor's initial temperature upon removal of the probe 15 from the well, as well as measuring the voltage on the battery located within the base housing. The pulse duration is controllably adjusted according to these two measurements. Thereafter, in step 103, the processor applies a second, sustain pulse to the resistor, which has a duration calculated to sustain the thermistor's temperature at about 93.0° F. when it is repeated every 200 milliseconds.

In a subsequent step 105, a decrementing predict clock is set to 200 milliseconds, to initiate the warming pulse cycle. Thereafter, the program remains in step 107 until the predict clock has timed out. The predict clock then is reset to 200 milliseconds in step 109, and the thermistor signal is measured in step 111. Another sustain pulse of the same duration as the first sustain pulse is applied to the resistor 31 in step 113, and it is then determined in step 114 whether or not the change in the thermistor's temperature since the previous measurement is less than 0.2° F. Such a condition would indicate that the thermistor's temperature has generally stabilized at some temperature at or near 93° F. In this initial pass through step 114, only one thermistor measurement is available, so the condition automatically is not met, and the program therefore returns to step 107, where it remains until the predict clock has timed out.

The program then repeats this open-loop sustain pulse cycle by proceeding again through steps 109, 111, 113 and 114, until it finally is determined in step 114 that the thermistor's temperature has adequately stabilized. When that occurs, the program proceeds to step 115, where it waits for the predict clock to time out, and in turn to step 117, where it again sets the predict clock to 200 milliseconds. Then, the thermistor signal is again measured in step 119, and it is determined in step 121 whether or not 1) the current temperature measurement exceeds 94.5° F. or 2) the current temperature measurement exceeds 91.5° F. and, at the same time, a pulse width of zero duration is computed using the formula set forth above. These conditions ordinarily would be met only after the probe 15 has been inserted into the patient's mouth.

If neither of the conditions set forth in step 121 has been met, the program proceeds to step 139, where it computes the temp error, temp slope, and integrated temp error variables, and calculates the appropriate pulse width using the formula set forth above. This calculated pulse width then is applied to the resistor 31, in step 141, and the program returns to step 115, where it waits for the predict clock to time out. The program then proceeds again through the steps 117, 119, and 121.

Eventually, one of the two conditions set forth in step 121 will be met, which ordinarily will occur only after the thermometer probe 15 has been placed into the patient's mouth. When this occurs, the program proceeds to step 123, where it determines whether or not an even number of settings of the predict clock have been made. This is required because patient temperature estimates are produced only after alternate readings of the thermistor 19. If not, meaning that an odd number of such settings have been made, then the program returns to step 115, as described above.

When it is determined at step 123 that an even number of predict clock settings have been made, the program proceeds to step 125, where it implements a prescribed prediction algorithm to estimate the patient's temperature based on the accumulated temperature samples. Thereafter, in step 127, it is determined whether or not the time since starting the prediction process has exceeded 1.2 seconds. If it has not, the program returns to step 115, where it remains until the predict clock has decremented to zero. Thus, seven thermistor samples and four temperature estimates must be made before 1.2 seconds have elapsed.

If, on the other hand, it is determined at step 127 that the time period since starting the prediction process has in fact exceeded 1.2 seconds, then the program proceeds to step 129 where it is determined whether or not the current temperature estimate lies within a relatively normal range of 97° F. to 99.5° F. If it does, then the program proceeds to step 131, where it is determined whether or not the difference between the maximum and minimum temperature estimates during the preceding 1.2 seconds (i.e., seven 200 millisecond samples) is less than 0.2° F. If it is, then it is determined that the current temperature estimate is valid, and the program proceeds to step 133 of displaying that temperature estimate.

On the other hand, if it is determined at step 129 that the current temperature estimate lies outside the 97° F. to 99.5° F. range, or if it is determined at step 131 that the difference between the maximum and minimum temperature estimates exceeds 0.2° F., then the program proceeds to step 135, where it is determined whether or not the time since starting the prediction process has exceeded 3.6 seconds. If it has not, the program returns to step 115, as described above. Thus, for patient temperatures outside the relatively normal range of 97° F. to 99.5° F., the thermistor sampling and temperature estimating will continue for at least 3.6 seconds.

When it is finally determined in step 135 that the time since starting the prediction process has exceeded 3.6 seconds, then the program proceeds to step 137, where it is determined whether or not the difference between the maximum and minimum temperature estimates during the preceding 2.0 seconds (i.e., eleven 200-millisecond samples) is less than 0.25° F. If it is, then it is determined that the current temperature estimate is valid and the program proceeds to step 133 of displaying the current temperature estimate. On the other hand, it is determined in step 137 that the difference between the maximum and minimum temperature estimates during the preceding 2.0 seconds exceeds 0.25° F., then the program returns to step 115 and the prediction process continues. Only when it is finally determined at step 137 that the maximum and minimum temperature estimates differ by less than 0.25 degrees will the prediction process finally be concluded.

Returning to step 121, where it is determined whether or not the current temperature measurement remains above 94.5° F. or alternatively remains above 91.5° F. with no warming pulses being applied to the resistor 31, if it is determined ever that that condition is no longer being met, then it is deduced that the probe 15 has been removed from the patient's mouth and that the warming procedure described above must be resumed. Thus, in step 139, the program calculates an appropriate pulse duration for the pulse-width modulation signal, using the formula set forth above. Then, in step 141, the pulse is applied to the resistor 31. The program then returns to the step 115 of waiting for the predict clock to decrement to zero.

In most cases, the thermometer 11 determines that a temperature estimate outside the 97° F. to 99.5° F. range is indeed valid when the end of the 3.6 second time period is first reached. More than 3.6 seconds ordinarily is required only when the probe 15 is not properly seated within the patient's mouth or rectum, or otherwise is being moved about excessively.

It should be appreciated from the foregoing description that the present invention provides an improved prediction-type medical thermometer that provides an accurate estimate of a patient's temperature in substantially reduced time as compared to prior thermometers of this kind. This improved performance is achieved by using a special hollow probe tip having a low heat capacity and incorporating a resistive heater that is actuated only upon removal of the probe from a base housing. The heater regulates the temperature to a value of about 93° F. After the probe is applied to the patient, a microprocessor periodically samples the thermistor and estimates the patient's temperature based on the successive samples. If a predetermined number of successive temperature estimates lie within a predetermined error range, the sampling is terminated and the most recent estimate is displayed as the patient's temperature. In addition, when that estimate lies outside of a normal temperature range, an increased number of successive estimates lying within a predetermined error range are required before the thermometer displays the estimated temperature.

Although the invention has been described in detail with reference only to the presently preferred embodiment, those skilled in the art will appreciate that various modifications can be made without departing from the invention. Accordingly, the invention is defined only by the following claims.

We claim:

1. A medical thermometer for estimating the temperature of a patient, comprising:

a probe;

a temperature sensor mounted in the probe, for producing a signal indicating the temperature of the probe;

a display;

a sampler for repeatedly sampling the temperature sensor signal, to produce a succession of temperature measurements; and a processor configured to repeatedly estimate the patient's temperature based on the succession of temperature measurements and to repeatedly determine the stability of the resulting succession of temperature estimates, wherein the processor provides a final estimate of the patient's temperature, for display on the display, when the determined stability of the succession of temperature estimates has a prescribed level of stability, wherein the prescribed level of stability is selected in accordance with the values of the succession of temperature estimates.

2. A medical thermometer as defined in claim 1, wherein the prescribed level of stability used by the processor is met when the succession of temperature estimates satisfies a first set of conditions, used when the most recent estimate of the patient's temperature lies within a predetermined range of values, or when the succession of temperature estimates satisfies a second set of conditions, used when the most recent estimate of the patient's temperature lies outside the predetermined range of values.

3. A medical thermometer as defined in claim 2, wherein:
the first set of conditions used by the processor includes a condition that a first predetermined number of successive temperature estimates lie within a first predetermined range of temperature values; and
the second set of conditions used by the processor includes a condition that a second predetermined number of successive temperature estimates, larger than the first predetermined number, lie within a second predetermined range of temperature values.

4. A medical thermometer as defined in claim 3, wherein:
the first set of conditions further includes a condition that the sampler have sampled the temperature sensor signal for a least a first predetermined minimum time duration; and
the second set of conditions further includes a condition that the sampler have sampled the temperature sensor signal for at least a second predetermined minimum time duration, longer than the first predetermined minimum time duration.

5. A medical thermometer as defined in claim 3, wherein the first predetermined range of temperature values is less than the second predetermined range of temperature values.

6. A medical thermometer as defined in claim 1, wherein:
the thermometer further includes an electrical heater mounted on the probe, in a predetermined relationship to the temperature sensor; and
the processor further is configured to measure an initial temperature at a start time, prior to receipt of the probe by the patient, and to apply to the heater an initial electrical signal having a prescribed parameter that varies according to the initial temperature measurement at the start time, to warm the probe.

7. A medical thermometer as defined in claim 6, wherein:
the initial temperature measurement at the start time is a measurement of the temperature of the probe; and
the processor produces the initial temperature measurement at the start time by measuring the temperature sensor signal.

8. A medical thermometer as defined in claim 1, wherein the sampler samples the temperature sensor signal at regular time intervals.

9. A medical thermometer as defined in claim 1, wherein the display does not display any estimate of patient temperature until the processor has determined that the prescribed level of stability has been met.

10. A medical thermometer for estimating the temperature of a patient, comprising:
a probe;
a temperature sensor mounted in the probe, for producing a signal indicating the temperature of the probe;
a display;
a sampler for sampling the temperature sensor signal at regular time intervals, to produce a succession of temperature measurements; and
a processor configured to repeatedly estimate the patient's temperature based on the succession of temperature measurements, wherein the processor provides a final estimate of the patient's temperature, for display on the display;
wherein if the most recent temperature estimate lies within a predetermined range of normal patient temperatures, then the processor provides the final estimate of the patient's temperature only if a first predetermined number of successive temperature estimates lie within a first predetermined range of temperature values;
and wherein, if the most recent temperature estimate lies outside a predetermined range of normal patient temperatures, then the processor provides the final estimate of the patient's temperature only if a second predetermined number of successive temperature estimates, larger than the first predetermined number, lie within a second predetermined range of temperature values.

11. A method for estimating a patient's temperature using a medical thermometer of the kind having a probe and a sensor that produces a signal indicating the temperature of the probe, comprising:
repeatedly measuring the sensor signal, to produce a succession of temperature measurements;
repeatedly evaluating the succession of temperature measurements using predetermined criteria, to provide a succession of estimates of the patient's temperature;
repeatedly determining the stability of the succession of temperature estimates; and
displaying a final estimate of the patient's temperature when the determined stability of the succession of temperature estimates has been determined to have a prescribed level of stability, wherein the prescribed level of stability is selected according to the values of the successive temperature estimates.

12. A method as defined in claim 11, wherein the prescribed level of stability used in displaying includes a first set of conditions, used when the most recent estimate of the patient's temperature lies within a predetermined range of values, and a second set set of conditions, used when the most recent estimate of the patient's temperature lies outside the predetermined range of values.

13. A method as defined in claim 12, wherein:
the first set of conditions used in displaying includes a condition that repeatedly measuring and repeatedly evaluating be performed for at least a first predetermined minimum time duration and further includes a condition that a first predetermined number of successive temperature estimates lie within a first predetermined range of temperature values; and
the set of conditions used in displaying includes a condition that repeatedly measuring and repeatedly evaluating be performed for at least a second predetermined minimum time duration, longer than the first predetermined time duration, and further includes a condition that second predetermined number of successive temperature estimates lie within a second predetermined range of temperature values.

* * * * *